(12) United States Patent
Walker et al.

(10) Patent No.: US 6,591,393 B1
(45) Date of Patent: Jul. 8, 2003

(54) MASKING ERROR DETECTION/ CORRECTION LATENCY IN MULTILEVEL CACHE TRANSFERS

(75) Inventors: Shawn Kenneth Walker, Fort Collins, CO (US); Dean A. Mulla, Saratoga, CA (US); Donald Charles Soltis, Jr., Fort Collins, CO (US); Terry L Lyon, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/507,208

(22) Filed: Feb. 18, 2000

(51) Int. Cl.$^7$ .............................................. G11C 29/00
(52) U.S. Cl. ...................................................... 714/763
(58) Field of Search ................................ 714/763, 764, 714/5, 805; 711/118

(56) References Cited

U.S. PATENT DOCUMENTS

| | | | |
|---|---|---|---|
| 5,444,619 A | | 8/1995 | Hoskins et al. |
| 5,604,753 A | * | 2/1997 | Bauer et al. ................. 714/763 |
| 5,629,950 A | * | 5/1997 | Godiwala et al. ........... 714/805 |
| 5,691,958 A | | 11/1997 | Calvert et al. |
| 5,706,194 A | | 1/1998 | Neff et al. |
| 5,828,981 A | | 10/1998 | Callender et al. |
| 5,859,999 A | | 1/1999 | Morris et al. .................. 712/23 |
| 5,860,017 A | | 1/1999 | Sharangpani et al. ....... 712/224 |
| 5,940,777 A | | 8/1999 | Keskes |
| 6,161,208 A | * | 12/2000 | Dutton et al. ................ 714/764 |

OTHER PUBLICATIONS

Michael Batzle and Zhijing Wang; Seismic properties of pore fluids; Geophysics; Nov. 1992; p. 1396–1408; vol. 57; No. 11.

M. A. Biot; Theory of Propagation of Elastic Waves in a Fluid–Saturated Porous Solid. I. Low–Frequency Range and II. Higher Frequency Range; The Journal of the Acoustical Society of America; Mar. 1956; p. 168–191; vol. 28; No. 2.

Fritz Gassmann; Uber die elastizitat poroser medien (English translation); Vier. Der Natur Gesellschaft; 1959; 96; p. 1–23; Zurich, Switzerland.

Michael D. McCormack; Neural computing in geophysics; Geophysics: The Leading Edge of Exploration; Jan. 1991; p. 11–15; vol. 10; no. 1.

M. Turhan Taner; Seismic attributes revisited; 64$^{th}$ Annual International Meeting, SEG Expanded Abtracts; 94; p. 1104–1106.

M. T. Taner, F. Koehler and R. E. Sheriff; Complex seismic trace analysis; Geophysics; Jun. 1979; p. 1041–1063; vol. 44; No. 6.

Wolfe, A., "Patents shed light on Merced's Innards", Electronic Engineering Times, Feb. 15, 1999.

* cited by examiner

*Primary Examiner*—Albert Decady
*Assistant Examiner*—Shelly A Chase

(57) ABSTRACT

Methods and apparatus mask the latency of error detection and/or error correction applied to data transferred between a first memory and a second memory. The method comprises determining whether there is an error in a data unit in the first memory; transferring data based on the data unit from the first memory to a second memory, wherein the transferring step commences before completion of the determining step; and disabling at least part of the second memory if the determining step detects an error in the data unit. The disabling step may be accomplished, for example, by disabling the buffering of an address of the data unit or stalling the second memory.

20 Claims, 3 Drawing Sheets

MASKING ERROR DETECTION/CORRECTION LATENCY IN MULTILEVEL CACHE TRANSFERS

TECHNICAL FIELD

The invention relates to computer memory systems. More particularly, the invention relates to error detection and/or correction among multilevel cache memories.

BACKGROUND ART

In a computer system, the interface between a processor and memory is critically important to the performance of the system. Because fast memory is very expensive, memory in the amount needed to support a processor is generally much slower than the processor. In order to bridge the gap between fast processor cycle times and slow memory access times, cache memory is utilized. A cache is a small amount of very fast memory that is used to store a copy of frequently accessed data and instructions from main memory. The microprocessor can operate out of this very fast memory and thereby reduce the number of wait states that must be interposed during memory accesses. When the processor requests data from memory and the data resides in the cache, then a cache read "hit" takes place, and the data from the memory access can be returned to the processor from the cache without incurring the latency penalty of accessing main memory. If the data is not in the cache, then a cache read "miss" takes place, and the memory request is forwarded to the main memory, as would normally be done if the cache did not exist. On a cache miss, the data that is retrieved from the main memory is provided to the processor and is also written into the cache due to the statistical likelihood that this data will be requested again by the processor in the near future.

The individual data elements stored in a cache memory are referred to as "lines." Each line of a cache is meant to correspond to one addressable unit of data in the main memory. A cache line thus comprises data and is associated with a main memory address in some way. Schemes for associating a main memory address with a line of cache data include direct mapping, full association and set association, all of which are well known in the art.

The presence of a cache should be transparent to the overall system, and various protocols are implemented to achieve such transparency, including write-through and write-back protocols. In a write-through action, data to be stored is written to a cache line and to the main memory at the same time. In a write-back action, data to be stored is written to the cache and only written to the main memory later when the line in the cache needs to be displaced for a more recent line of data or when another processor requires the cached line. Because lines may be written to a cache exclusively in a write-back protocol, precautions must be taken to manage the status of data in a write-back cache so as to preserve coherency between the cache and the main memory. The preservation of cache coherency is especially challenging when there are several bus masters that can access memory independently. In this case, well known techniques for maintaining cache coherency include snooping and snarfing.

A cache may be designed independently of the microprocessor, in which case the cache is placed on the local bus of the microprocessor and interfaced between the processor and the system bus during the design of the computer system. However, as the density of transistors or a processes chip has increased, processors may be designed with one or more internal caches in order to decrease further memory access times. An internal cache is generally small, an exemplary size being 8 Kb (8192 bytes) in size. In computer systems that utilize processors with one or more internal caches, an external cache is often added to the system to further improve memory access time. The external cache is generally much larger than the internal cache(s), and, when used in conjunction with the internal cache(s), provides a greater overall hit rate than the internal cache(s) would provide alone.

In systems that incorporate multiple levels of caches, when the processor requests data from memory, the internal or first level cache is first checked to see if a copy of the data resides there. If so, then a first level cache hit occurs, and the first level cache provides the appropriate data to the processor. If a first level cache miss occurs, then the second level cache is then checked. If a second level cache hit occurs, then the data is provided from the second level cache to the processor. If a second level cache miss occurs, then the data is retrieved from main memory (or higher levels of caches, if present). Write operations are similar, with mixing and matching of the operations discussed above being possible.

A common transaction in a multilevel cache system is a fill operation. In a fill operation, a line of a higher level cache is copied into a lower level cache. Before writing the copied line into the lower level, it is prudent to take measures to ensure that the line is valid (i.e., free of errors). Errors can be introduced into a cache memory array—or any memory—when alpha particles, cosmic rays or some other electrical disturbance causes one or more bits to change logical state. Although data corruption is very rare, its consequences are significant—almost always forced shutdown of the processor. To guard against this possibility, cache lines can be encoded using an error correction code (ECC). ECC encoding utilizes additional bits to represent the line as a codeword containing a small amount of controlled redundancy, so as to enable detection and correction of the most common errors (e.g., single bit errors or double bit errors). As the amount of redundancy is increased, the error detection and correction capability of the ECC encoding is increased. During a fill operation, an error detection and correction algorithm is performed on the basis of the ECC encoding before the line is copied to the lower level cache. Unfortunately, the time required for execution of the error detection and correction algorithm significantly slows the transfer of the line. In particular, the error detection and correction algorithm may require one or more computer cycles. Only after those cycles can the lower level cache begin to process the transferred data. Such processing typically includes buffering of the line and its tag (address) before the line is written to the lower level cache.

This latency problem is better understood by considering FIG. 1, which shows a block diagram of known circuitry 100 for a filling operation from an L1 cache 105 to an L0 cache 110. The L1 cache 105 and the L0 cache 110 are solid state memories, which may be physically packaged together on the same integrated circuit or separately on distinct integrated circuits (and perhaps combined with other circuitry not shown). The L1 cache 105 outputs an M+L bit data codeword CODEWORD, an N bit address word TAG for the address of the data codeword CODEWORD, and a control line FILL VALID. The M+L bit data codeword CODEWORD contains M data bits and L redundant bits for ECC. The control line FILL VALID is asserted (i.e., one, set, hot or high) when the values on the address line TAG and/or the data codeword CODEWORD are valid and ready to transfer.

The data codeword CODEWORD is input from the L1 cache 105 to an error detection and correction circuit 115, which outputs a control signal /ERROR, which is high when an error is not detected. The error detection and correction circuit 115 also outputs a possibly corrected data word DATA', which is the same as the M raw data bits in the codeword CODEWORD, if no errors are detected (assuming that the ECC is systematic). If a correctable error is detected, then the data word DATA' is the corrected data pattern. The control signal /ERROR is input to an AND gate 125, to which the control signal FILL VALID is also input. The output of the AND gate 125 is a control signal WRITE ENABLE, which is high when the L1 cache 105 is ready to proceed with the fill operation and when no errors have been detected in the data codeword CODEWORD.

The control signals /ERROR and WRITE ENABLE are not formed until the error detection and correction circuitry 105 has completed processing of the data codeword CODEWORD. As mentioned above, this processing may require one or more computer cycles. The L0 cache 110 cannot write the data word DATA' until after the control signal ENABLE is formed. Thus, a delay elapses before writing of the transferred cache line.

SUMMARY OF THE INVENTION

In one respect, the invention is a method for masking the latency of error detection and/or error correction applied to data units transferred between a first memory and a second memory. The data units may be codewords having redundant bits that provide error detection and/or correction capability. The method comprises the following steps: determining whether there is an error in a data unit in the first memory; transferring data based on the data unit from the first memory to a second memory, wherein the transferring step commences before completion of the determining step; and disabling at least part of the second memory if the determining step detects an error in the data unit. Optionally, the method corrects the error in the data unit, if the error is correctable. Preferably, the first memory and the second memory are cache memories, and the data unit is a cache line. The disabling step may be accomplished, for example, by forcing all accesses to the second memory to return misses or by stalling the second memory.

In another respect, the invention is an apparatus. The apparatus comprises a first memory, a second memory and error detection circuitry. The first memory stores error protection encoded codewords. The error protection may be error detection capability, error correction capability or both. Data corresponding to a codeword is transferred from the first memory to the second memory regardless of whether the data contains an error. The error detection circuitry disables at least part of the second memory if the data transferred to the second memory contains a detectable error. Preferably, the first memory and the second memory are cache memories, and the second cache memory resides between the first cache memory and a microprocessor core.

In yet another respect, the invention is an apparatus for avoiding the latency of error detection and/or correction applied to a unit of data in a first memory. The apparatus comprises a disable logic and a second memory. The disable logic is connected to the first memory and provides a disable signal in response to detection of an error in the unit of data. Receipt of the disable signal by the second memory causes a stall of the second memory. Preferably, the first memory is a higher level cache, and the second memory is a lower level cache. Optionally, the second cache memory comprises a tag buffer and a data buffer, and the disable signal is connected to the tag buffer.

DETAILED DESCRIPTION OF A PREFERRED EMBODIMENT

Figure 1:
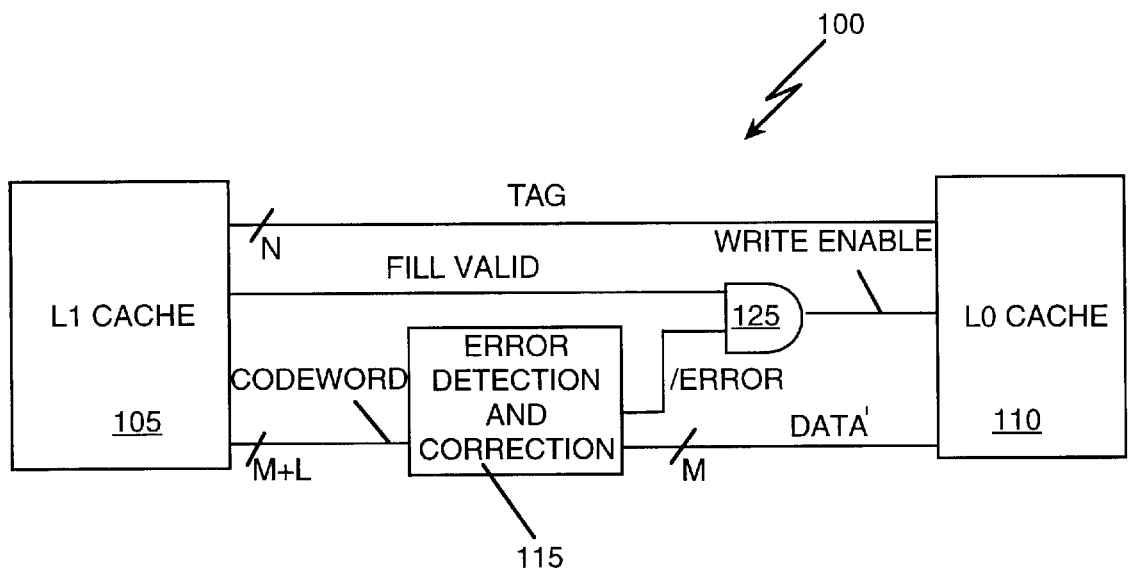
FIG. 1 is a block diagram of known circuitry for a cache filling operation.
Figure 2:
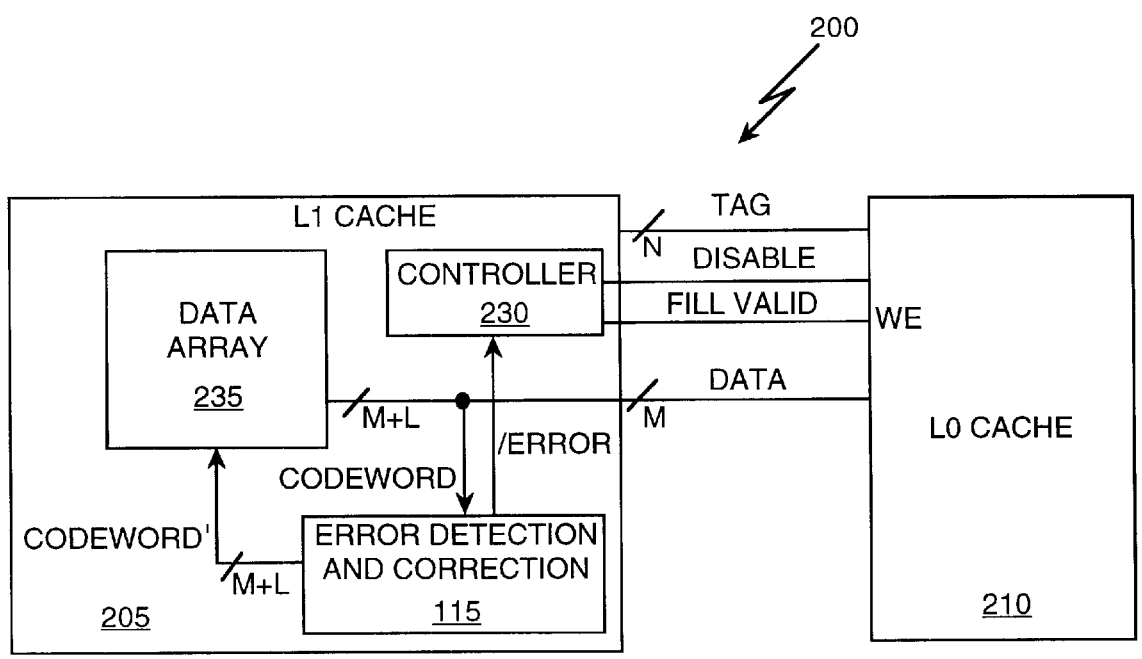
FIG. 2 is a block diagram of circuitry for a cache filling operation according to one embodiment of the invention.

FIG. 2 is a block diagram of circuitry 200 for a cache filling operation according to one embodiment of the invention. The circuitry 200 is an improvement over the circuitry 100 illustrated in FIG. 1. In particular, the circuitry 200 performs a filling operation from the L1 cache to the L0 cache with less delay than the circuitry 100. Like the circuitry 100, the circuitry 200 comprises two caches—an L1 cache 205 and an L0 cache 210. The L1 cache 205 is like the L1 cache 105 except that the error detection and correction circuitry 115 is an integral part of the L1 cache 205. The error detection and correction circuitry 115, detects and/or corrects errors in a data codeword CODEWORD output from the data array 235. However, unlike the circuitry 100, M raw data bits from the data codeword CODEWORD, those M raw data bits forming a data word DATA, are connected directly to the L0 cache 210. Another difference between the circuitry 100 and the circuitry 200 is that the control signal FILL VALID in the circuitry 200 is directly connected to the write enable (WE) of the L0 cache 210, rather than being ANDed with an error detection control signal that is dependent upon the error detection and correction circuit 115. As a result of these differences, the data word DATA is written into the L0 cache 205 without waiting for the output of the error detection and correction circuit 115. If no error is detected by the error correction and detection circuit 115, as most often happens, then time is saved for that filling operation. Even in the best case when the error detection and correction circuit 115 produces its output signals in a single compute cycle, this amounts to a significant time saving.

In the rare circumstance when there is an error in the data codeword CODEWORD, then, provided the error is detectable, the error detection and correction circuit 115 asserts the control signal/ERROR, which is connected to a cache controller 230. The cache controller 230 asserts a control signal DISABLE when the control signal /ERROR is low (signifying that an error has been detected). The control signal DISABLE is connected to the L0 cache 210 and/or to a microprocessor core (not shown). When disabled by the control signal DISABLE, the L0 cache 210 can simply stall or return a miss in response to all accesses. That is, the L0 cache 210 becomes globally disabled. Since it is harmless to write an erroneous data word into the L0 cache 210 if the data cannot be used, the latency of the error detection and correction circuit 115 can be removed from the fill path. Instead, control signal DISABLE only needs to be generated in time to prevent subsequent uses of the data.

If the error detection and correction circuit 115 detects an error in the data codeword CODEWORD and if the error is correctable, the error detection and correction circuit 115 provides a corrected data codeword CODEWORD' to the memory array 235, where the data words are stored as cache lines. After correction, subsequent fill operations of the same cache line occur without error. Thus, in response to a detected error, the controller 230 can force a repeated attempt to fill the same cache line, and if the error has been corrected, the second attempted fill is error free so that the control signal DISABLE can be cleared.

Figure 3:
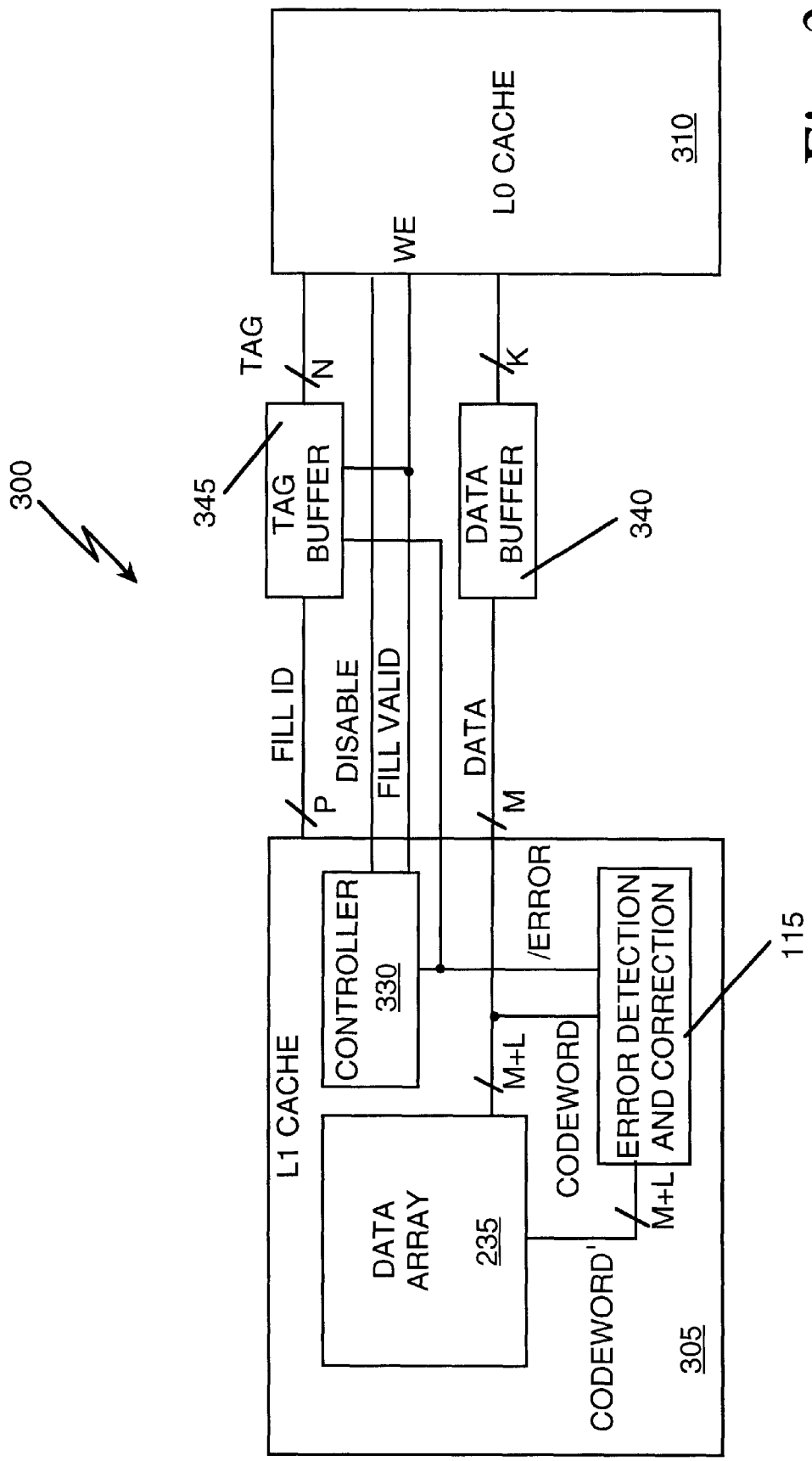
FIG. 3 is a block diagram of circuitry for a cache filling operation according to another embodiment of the invention.

Another embodiment of the invention is shown in FIG. 3, which is a block diagram of circuitry 300 for a cache filling operation. An L1 cache 305 and an L0 cache 310 in the circuitry 300 are similar to the L1 cache 205 and the L0 cache 210, respectively, in the circuitry 200. However, in the circuitry 300, the size (K bits) of a cache line in the L0 cache 310 is larger than the size (M bits) of the data word DATA. Typically, M is a multiple of K (e.g., M=2K). To deal with the difference in sizes, a data buffer 340 latches M/K consecutive data words DATA, until it has enough to fill a line of the L0 cache 310. Coincident with the transfer of data words DATA to the data buffer 340, the L1 cache 305 transmits an address word FILL ID to a tag buffer 345. The address word FILL ID is preferably a short (e.g., three bits) word that identifies a tag out of an array of possibilities. The tag buffer 345 outputs the address word TAG on the basis of the address word FILL ID. Because it takes several cycles before a given line is ready to be written to the L0 cache line 310, a controller 330 (which is similar to the controller 230 in the circuitry 200), asserts the control signal FILL VALID when all of the components of the L0 cache line have been buffered in the data buffer 340 and the control signal FILL ID has been received by the tag buffer 345. The control signal FILL VALID is connected to the write enable (WE) port of the L0 cache. When asserted, the control signal FILL VALID causes the L0 cache 310 to write the cache line.

The tag buffer 345 also receives the control signal/ERROR, which is pulled low by the error detection and correction circuit 115 in the event that it detects an error. In response to a low logic state on the control signal/ERROR, the tag buffer 345 does not deallocate the tag buffer entry corresponding to the address word FILL ID. This has the effect of preserving the address TAG in the tag buffer 345, so that it will be available after the error detection and correction circuit 115 forms the corrected data word DATA', whose components are then transferred to the data buffer 340, because the uncorrected and corrected versions of the cache line have the same tag. In this way, an erroneous cache line is written to the L0 cache 310 and then the corrected cache line is written over the erroneous cache line in the L0 cache 310.

The control signal FILL VALID is also connected to the tag buffer 345 and functions similarly to the control signal /ERROR. That is, a low logic state on the control signal FILL VALID prevents the tag buffer 345 from deallocating entries.

Figure 4:
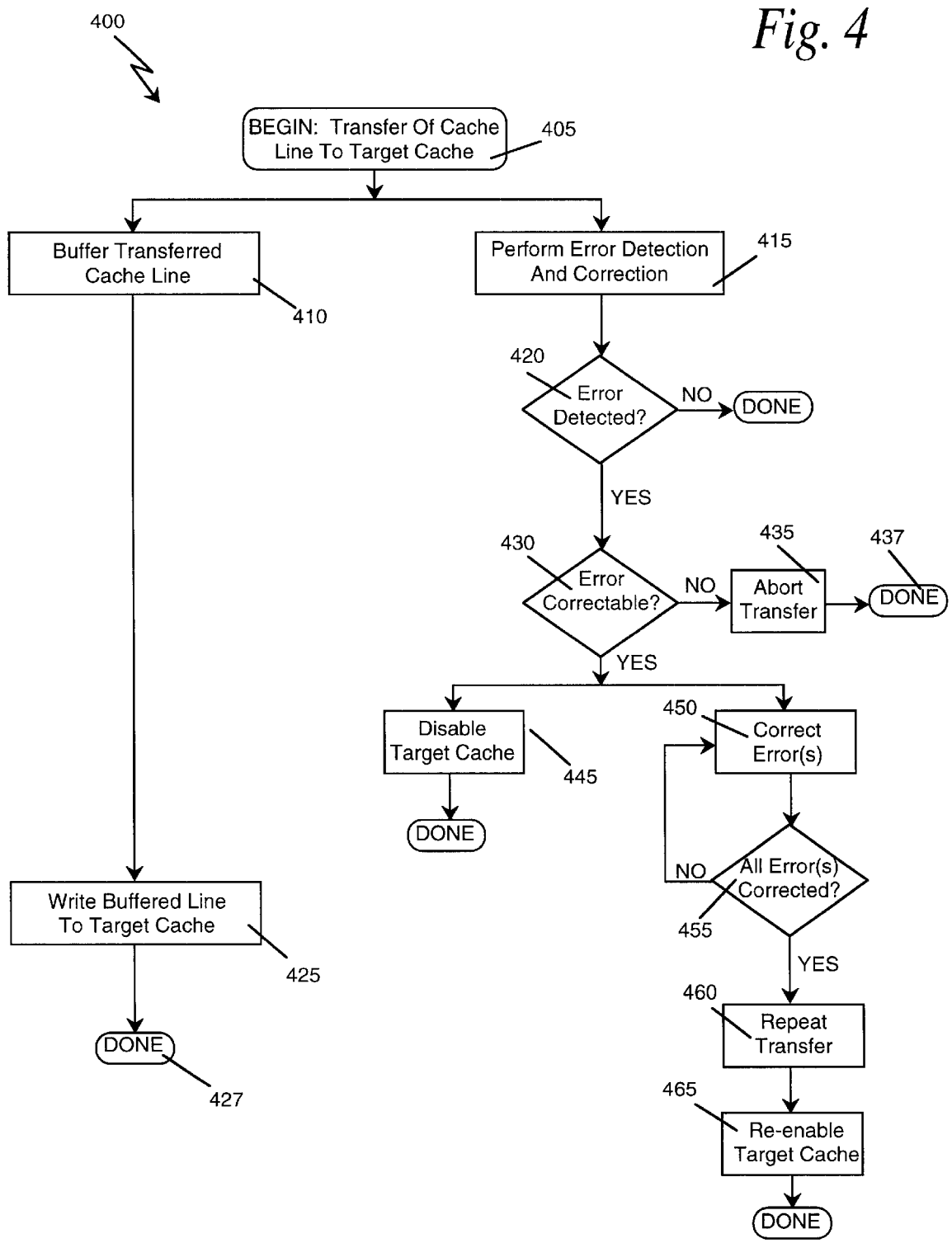
FIG. 4 is a flowchart of a method for performing a cache filling operation according to an embodiment of the invention.

FIG. 4 is a flowchart of a method 400 for performing a cache filling operation according to an embodiment of the invention. The method 400 transfers a cache line to a target cache. The method 400 begins at an entry point 405. In parallel two steps are performed. The method 400 buffers (410) the transferred line and simultaneously performs (415) error detection and/or correction. The buffering step 410 may involve buffering of the tag portion and/or the data portion of the line. Alternatively, the buffering step 410 can be omitted. After the buffering step 410, if performed, the method 400 writes (425) the line to the target cache and that leg of the process 400 exits at an exit point 427.

Concurrently along the other main leg of the process 400, the error detection/correction step 415 is applied to the cache line. The method 400 tests (420) whether an error(s) has been detected. If no error(s) has been detected, that leg of the method 400 completes. If an error(s) has been detected, the method 400 next tests (430) whether the error(s) is correctable or not. If the error(s) is not correctable, the method 400 aborts (435) the transfer and the second (right) main leg of the process 400 terminates at an exit point 437. Exemplary mechanisms for aborting include faulting the target cache and/or the microprocessor core. The disabling step 445 can be accomplished by ensuring that all read accesses return as misses, stalling the target cache and/or stalling or disabling a microprocessor core connected to the target cache. A testing step 455 repeats the correcting step 450 as many times as necessary until all errors are corrected. Alternatively, the ECC may be designed such that multiple errors are correctable in one pass. In either case, after all errors have been corrected, the method repeats (460) the transfer. The repeating step 460 may be viewed as a form of recursion, wherein the repeating step calls a nested process 400 that begins at the entry point 405. When the nested process 400 exits at the exit points 427 and 437, the nested process 400 returns to the repeating step 460, at which point the (main) process 400 proceeds to re-enable (465) the target cache.

The terms and descriptions used herein are set forth by way of illustration only and are not meant as limitations. For example, the L1 and L0 caches 205 and 210 may be other memories, such as main memory or register files in a microprocessor, respectively. Furthermore, redundant data bits, in addition to raw data bits, may be transferred from the L1 cache 205 to the L0 cache 210. That is, codewords rather than uncoded data may be transferred from the L1 cache 205 to the L0 cache 210. Those skilled in the art will recognize that these and many other variations are possible within the spirit and scope of the invention as defined in the following claims, and their equivalents, in which all terms and phrases are to be understood in their broadest reasonable sense.

What is claimed is:

1. A method comprising:

determining whether there is an error in a data unit in a first memory;

transferring data based on the data unit from the first memory to a second memory, wherein the transferring step commences before completion of the determining step; and disabling at least part of the second memory if the determining step detects an error in the data unit.

2. The method of claim 1 further comprising:

correcting the error in the data unit.

3. The method of claim 1 wherein the first memory and the second memory are cache memories, and the data unit is a cache line.

4. The method of claim 1 wherein the transferring step comprises:

buffering the data based on the data unit before writing the data in the second memory.

5. The method of claim 1 further comprising:

transferring an address of the data from the first memory to the second memory.

6. The method of claim 5 further comprising:

buffering the address of the data before writing the data unit in the second memory.

7. The method of claim 1 wherein the disabling step comprises:

forcing accesses to the data to miss the second memory.

8. The method of claim 1 wherein the disabling step comprises stalling the second memory.

9. The method of claim 1 wherein the second memory is a register file in a microprocessor.

10. An apparatus comprising:

a first memory, wherein the first memory stores error protection encoded codewords;

a second memory, connected to the first memory, wherein data corresponding to one of the codewords is transferred from the first memory to the second memory regardless of whether the data contains an error;

error detection circuitry, connected to the first memory and the second memory, wherein the error detection circuitry disables at least part of the second memory if the data transferred to the second memory contains a detectable error.

11. The apparatus of claim 10 wherein the first memory and the second memory are cache memories.

12. The apparatus of claim 11 further comprising:

a microprocessor core, wherein the second cache memory is between the first cache memory and the microprocessor core.

13. The apparatus of claim 10 further comprising:

one or more buffers connected between the first memory and the second memory.

14. The apparatus of claim 10 further comprising:

error correction circuitry, connected to the first memory, wherein the error correction circuitry is capable of correcting errors in the codewords residing in the first memory.

15. An apparatus for avoiding the latency of error detection and/or correction applied to a unit of data in a first memory, the apparatus comprising:

a disable logic, integral to the first memory, wherein the disable logic provides a disable signal in response to detection of an error in the unit of data; and a second memory, connected to the first memory and the disable logic, the second memory comprising:
means for avoiding latency of error detection, and
means for preventing error propagation.

16. The apparatus of claim 15 wherein the first memory and the second memory are cache memories.

17. The apparatus of claim 16 wherein the first cache memory is a higher level cache than the second cache memory.

18. The apparatus of claim 16 wherein the second cache memory comprises a tag buffer.

19. The apparatus of claim 18 wherein the disable signal is connected to the tag buffer.

20. The apparatus of claim 16 wherein the second cache memory comprises a data buffer.

* * * * *